United States Patent [19]

Yamano

[11] Patent Number: 5,594,928
[45] Date of Patent: Jan. 14, 1997

[54] AUTOFOCUS CAMERA AND METHOD

[75] Inventor: Shozo Yamano, Tokyo, Japan

[73] Assignee: Nikon Corporation, Tokyo, Japan

[21] Appl. No.: 491,584

[22] Filed: Jun. 19, 1995

[30] Foreign Application Priority Data

Sep. 30, 1994 [JP] Japan .................................. 6-237540

[51] Int. Cl.⁶ ...................................................... G03B 7/00
[52] U.S. Cl. .............................................. 396/95; 396/265
[58] Field of Search ................................ 354/412, 173.1, 354/484, 400–409, 173.11

[56] References Cited

U.S. PATENT DOCUMENTS

| | | | |
|---|---|---|---|
| 4,918,538 | 4/1990 | Saito et al. | 358/335 |
| 4,974,003 | 11/1990 | Ohnuki et al. | |
| 5,057,859 | 10/1991 | Ishimaru | 354/400 |
| 5,319,412 | 6/1994 | Hamada et al. | |
| 5,408,290 | 4/1995 | Haraguchi | 354/402 |

FOREIGN PATENT DOCUMENTS 2-15210  1/1990  Japan .

Primary Examiner—Safet Metjahic
Assistant Examiner—Eric Nelson
Attorney, Agent, or Firm—Oliff & Berridge

[57] ABSTRACT

An automatic focus camera conducts automatic focus when the photographic preparation sequence in continuous photography automatic focussing are not completed in a fixed time. The photographic preparation sequence includes the shutter action preparation and film supply preparation. The automatic focus camera includes a shooting lens, a photographic mode switch that selects whether or not to conduct continuous photography, a photoelectric conversion device that performs focus state detection, a driving motor that drives the shooting lens, and a microcomputer. The microcomputer predictively determines the photographic preparation sequence completion time. When the photographic mode switch is set to continuous photography, the microcomputer determines the subject image plane position at the time of the next exposure based on the focus state detection results and the predicted computation results.

18 Claims, 12 Drawing Sheets

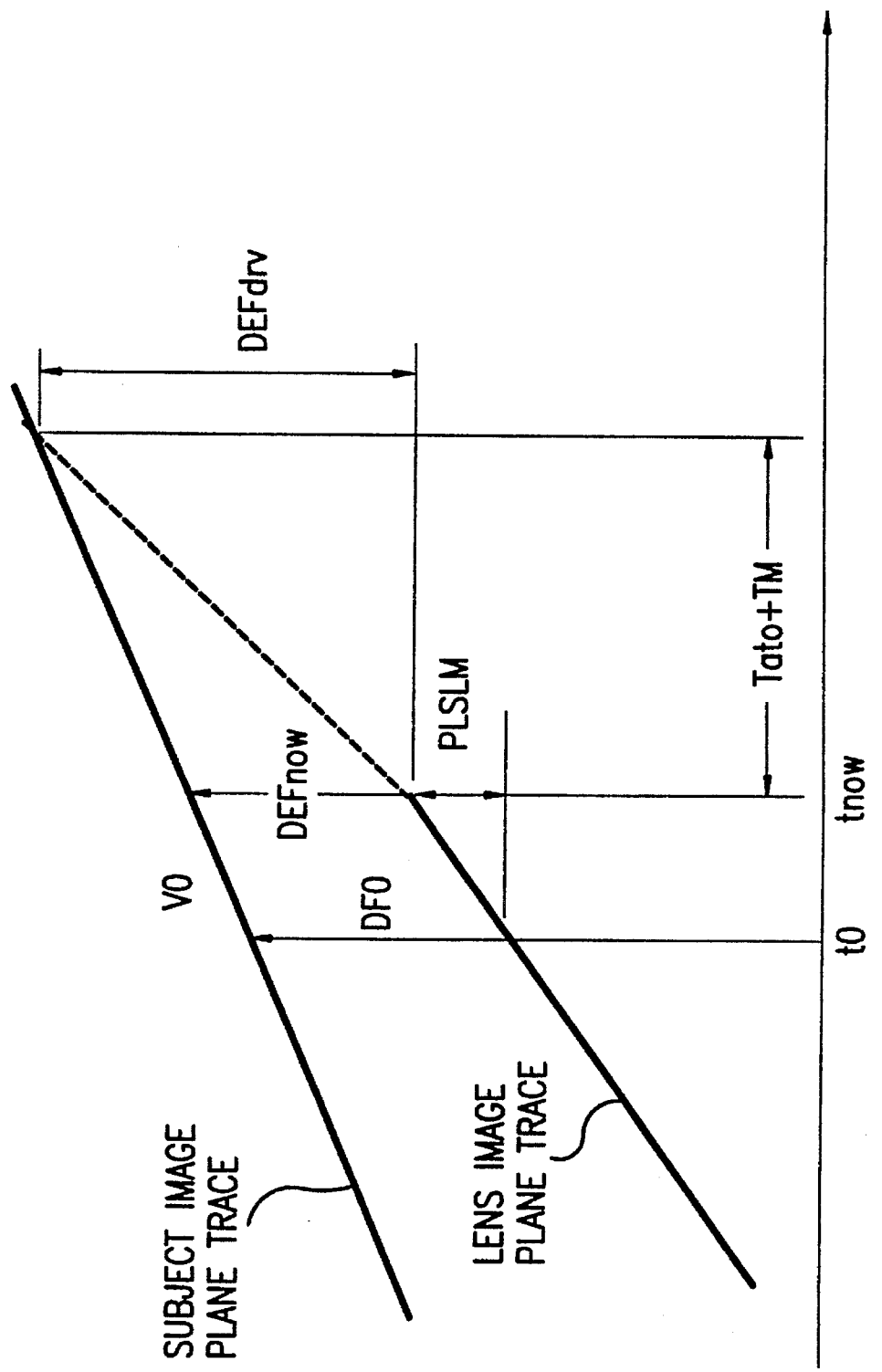

AUTOFOCUS CAMERA AND METHOD

BACKGROUND OF THE INVENTION

1. Field of the Invention

The present invention relates to a camera that has a continuous photographic mode and that performs automatic focus adjustment on a moving subject.

2. Background of Related Art

A conventional single lens reflex camera predicts the subject position at the time of exposure when the subject is a moving subject and drives the lens to a corresponding focus position.

When continuously photographing a moving subject, the single lens reflex camera lowers the mirror after completing the photograph, and immediately performs focus state detection after the subject image is stabilized. Lens driving is started based on the focus state detection result. Continuous photography of a moving subject in a conventional camera is performed by making the assumption of constant frame intervals that indicate the time from the start of the photograph to the completion.

However, when the shutter preparation (shutter charge) time or the film supply time is delayed during continuous photography because of a drop in the voltage of the camera power source by more than a predetermined time interval, the time between interval frames changes. During continuous photography, in this case, a conventional automatic focus camera having a constant frame interval still drives the lens according to the premise that the photographic preparation sequence (shutter preparation and film supply) completes in a predetermined time. Thus, when the photographic preparation sequence does not complete in the predetermined time, the subject image plane position at exposure deviates. Therefore, an out of focus photograph results.

The present invention provides an automatic focus camera that maintains precise automatic focus adjustment when the photographic preparation sequence, including at least the shutter action preparation and film supply preparation, is not completed in a fixed time. In other words, the frame interval time can change because of certain factors and precise automatic focus is maintained.

BACKGROUND OF THE INVENTION

The present invention is an automatic focus camera including a photographic optical system that composes an image of the subject, a photographic mode selection device selecting whether to continuously photograph a subject, a focus state detection device performing focus state detection of the subject, a driving device adjusting the photographic optical system based on the detection results of the focus state detection device, and an algorithm device determining a driving amount for the photographic optical system for focus adjustment. The automatic focus camera further includes a prediction algorithm device predicting the photographic preparation sequence completion time, a position computation device determining the subject image plane position of the next exposure based on the focus state detection results and the prediction computation results when the photographic mode selection device selects continuous photography, and the driving device adjusts driving based on the position computation results.

When the length of time between frames fluctuates during continuous photography, the fluctuation time is added to the computation of the subject image plane position. Therefore, precisely focussed photographs are still obtained.

Other objects, advantages and salient features of the invention will become apparent from the detailed description taken in conjunction with the annexed drawings, which disclose preferred embodiments of the invention.

BRIEF DESCRIPTION OF THE DRAWINGS

The invention will be described with reference to the following drawings in which like reference numerals refer to like elements and wherein:

FIG. 7 is a drawing showing the relationship between the subject image plane trace and the image plane movement trace used to determine lens driving in a camera according to an embodiment;

DETAILED DESCRIPTION OF PREFERRED EMBODIMENTS

Figure 1:
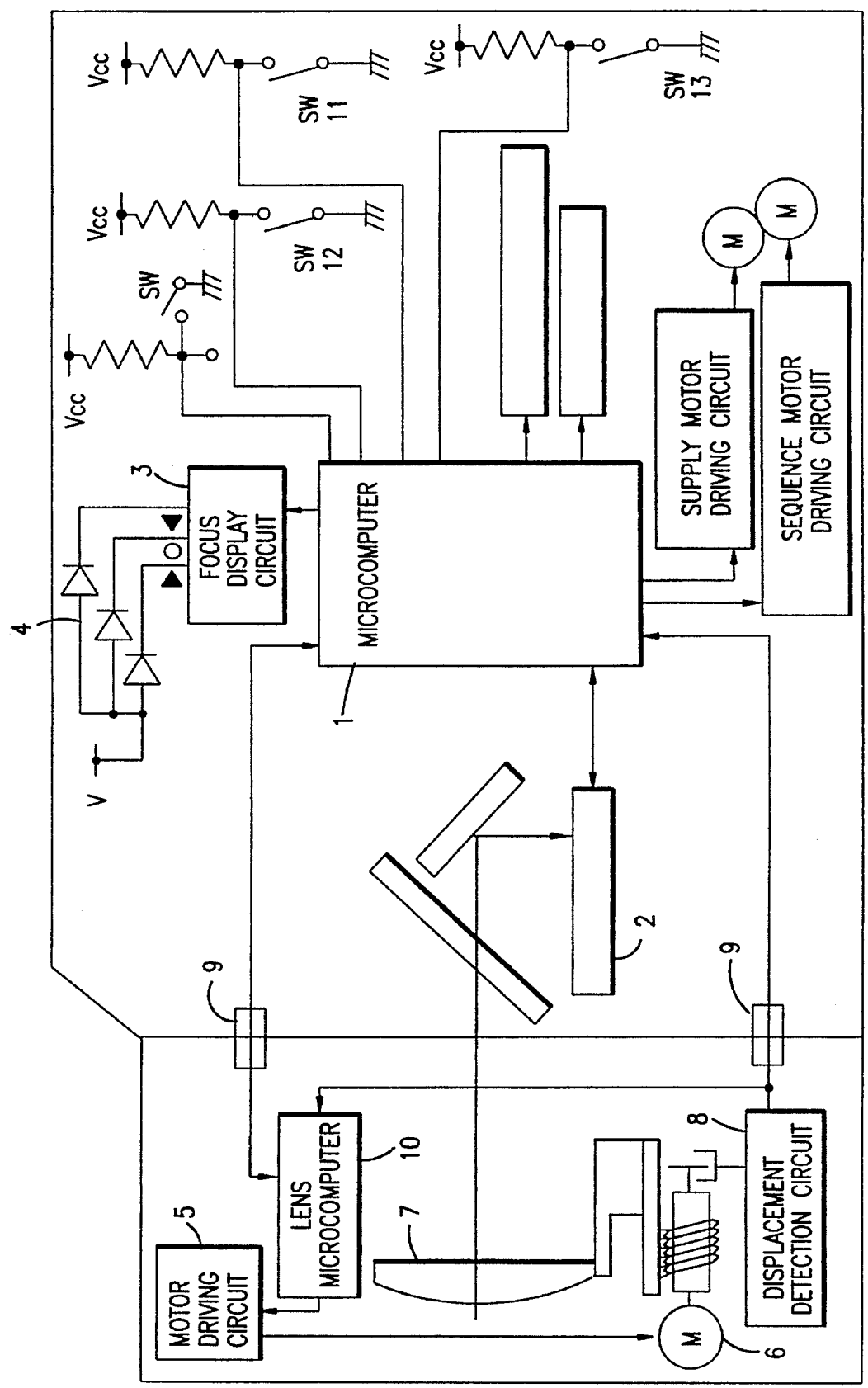
FIG. 1 is a schematic drawing of a camera according to an embodiment of the present invention.

FIG. 1 is a schematic diagram showing one preferred embodiment of the automatic focus camera according to the present invention. A microcomputer 1 in the camera body is preferably a single chip microcomputer having a CPU, a ROM, a RAM, an I/O port, and various additional functions including: a serial communication function, an A/D conversion function, a timer function, a time measuring function, an "event count" function, and an external interruption function. Microcomputer 1 controls the camera.

The camera microcomputer 1 can also be implemented as a single special purpose integrated circuit (e.g., ASIC) having a main or central processor section for overall, system-level control, and separate sections dedicated to performing various different specific computations, functions and other processes under control of the central processor section. It will be appreciated by those skilled in the art that the controller can also be implemented using a plurality of separate dedicated or programmable integrated or other electronic circuits or devices (e.g., hardwired electronic or logic circuits such as discrete element circuits, or programmable logic devices such as PLDs, PLAs, PALs or the like). The controller can also be implemented using a suitably programmed general purpose computer, e.g., a microprocessor, microcontroller or other processor device (CPU or MPU), either alone or in conjunction with one or more peripheral (e.g., integrated circuit) data and signal processing devices.

Light from the subject having passed through the shooting lens are composed into a pair of subject images on the light receptors of a electric charge accumulation type photoelectric conversion element 2 by a focus state detection optical system (not shown). The photoelectric conversion element 2 creates a subject image signal corresponding to the light intensity distribution of the pair of subject images composed on the light receptors. The photoelectric conversion element 2 outputs the subject image signal to the A/D conversion terminal of the microcomputer 1 for A/D conversion. The microcomputer 1 further performs focus state detection using computations well known in the art and the subject image data. When focus state detection computations cannot be performed because the focus adjustment state of the shooting lens is low, low contrast is obtained as the result of the computations.

A focus display driving circuit 3 connects to the microcomputer 1, and the microcomputer 1 drives the focus display driving circuit 3 to display a predetermined display pattern on an LED 4 corresponding to the focus state detection results.

The microcomputer 1 performs serial communication with a lens microcomputer 10 through a lens connection group 9, and receives specific lens data (such as focal length, completely open F number, exit pupil position, image plane displacement per output pulse of a displacement detection circuit 8, and the like). The microcomputer 1 can also designate a focus adjustment driving amount for the lens, preferably using predetermined commands.

A half-depressed switch 11 and a release switch 12 are connected to and turned on by an external operation button (not shown). Both are connected to a terminal of the microcomputer 1 at one end and have a resistor attached to the power source on the other end. In addition, a charge switch 13 connects to the microcomputer 1 using a similar configuration. The charge switch 13 is on during shutter charging. Specifically, the release switch 12 and the charge switch 13 connect to external interruption terminals.

Further, the microcomputer 1 connects to a sequence motor driving circuit, a film supply motor driving circuit, a stop control circuit, a shutter control circuit, and shutter control. Shutter control determines the sequence motor driving, the film supply motor driving, the stop value at the time of the photograph, and the exposure time based on instructions from the microcomputer 1.

The lens microcomputer 10 is preferably positioned on the shooting lens side and transmits data concerning the shooting lens by communication with the camera body to the microcomputer 1. The lens microcomputer 10 also drives a motor driving circuit 5 and a focus adjustment motor 6 based on the focus adjustment driving amount data received from the microcomputer 1. A displacement detection circuit 8 monitors the displacement of a focus adjustment optical system 7 caused by the focus adjustment motor 6. The displacement detection circuit 8 then outputs the displacement result to the lens microcomputer 10 and the microcomputer 1 through the lens connection group 9. Thus, the microcomputer 1 can also monitor the displacement result of the focus adjustment optical system 7. The displacement detection circuit 8 is composed of a photo-interrupter or the like.

Preferably, focus adjustment actions are conducted in response to the turning on of the half-depressed switch 11 linked to the operation of a release button. However, the half-depressed switch 11 does not limit the scope of the present invention. Thus, the following description presumes the half-depressed switch is on.

Figure 2:
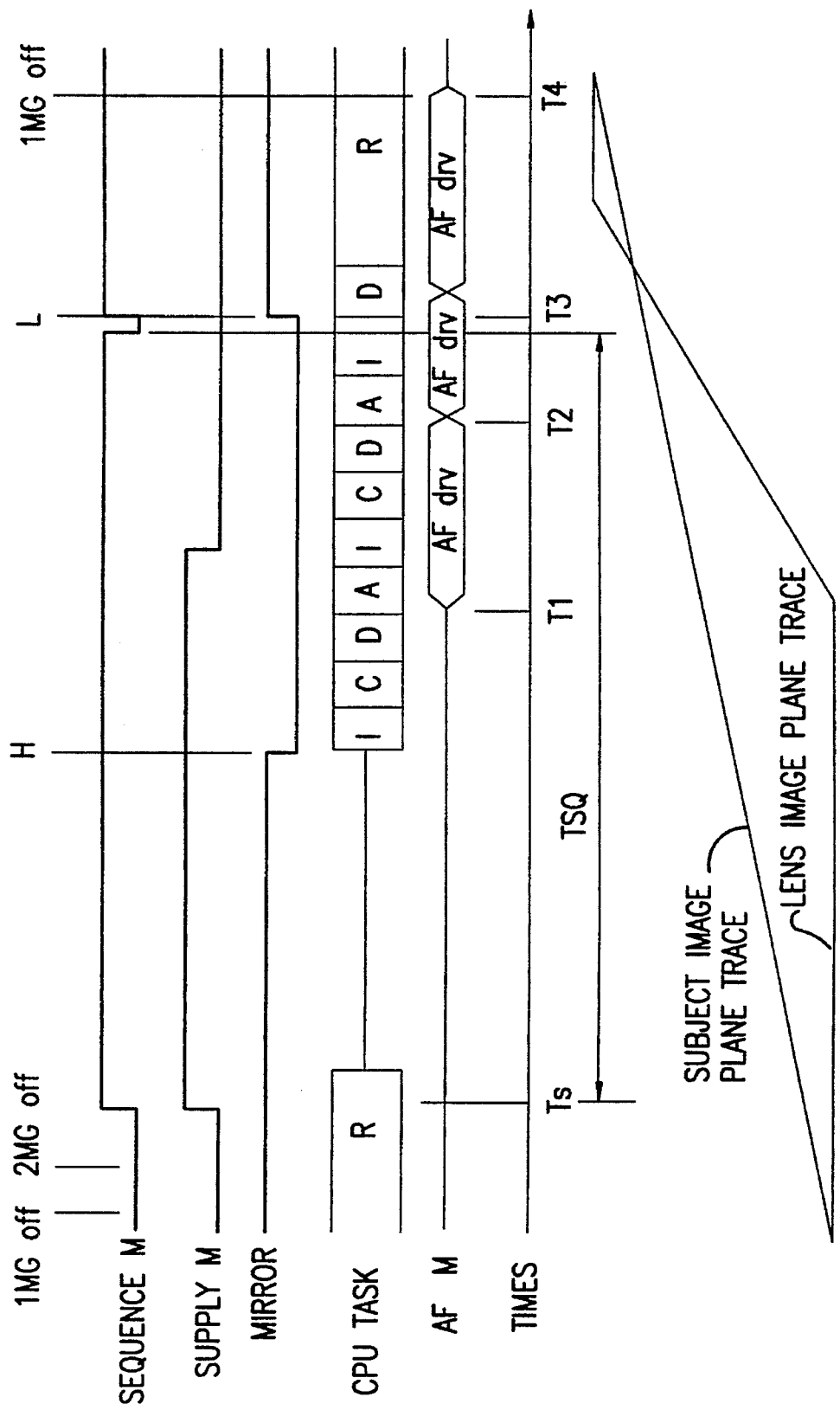
FIG. 2 is a timing chart for a camera according to an embodiment.

FIG. 2 shows a timing chart of the condition of the camera sequence motor driving and AF motor driving during continuous photography of the first preferred embodiment, and a trace of the subject image plane and a trace of the lens image plane.

Sequence M shows a sequence motor driving state and the shutter charge that enables the next photograph after turning off the support actions for the front blind (1MG) and the rear blind (2MG). The spacing between the support actions determines the shutter time, which is measured in seconds. Driving the sequence motor starts at time Ts and ends when a change in the state of a mechanical switch (not shown) indicates shutter charging has ended.

Supply M shows a supply motor driving state. The film supply motor turns on and starts supplying the film with the same timing as the sequence motor. However, film supply motor driving ends when a predetermined amount of film has been supplied.

The Mirror signal symbolically shows the action of the mirror in the camera body. H shows the up state of the mirror at the start of the release sequence. After lowering the mirror following a photograph and after a stabilizing time interval has elapsed, L shows the lowered state of the mirror. Photometry and range measurement become possible at time L because light from the subject stabilizes. The mirror is maneuvered using a portion of the drive force during sequence motor driving. The mirror signal is maintained within the microcomputer 1.

CPU task designates primary tasks of the microcomputer 1, where R is the release task, I is CCD accumulation control, CCD data dumping and CCD data A/D conversion, C is the focus state detection computations, D is the automatic focus (AF) process, and A is the automatic exposure (AE) process.

AF M represents the AF lens driving state, which is started by the AF process (D) in the microcomputer 1 following the lowering of the mirror. In addition, when AF lens driving is started again based on new data from the focus state detection computation results during driving, the action of the AF lens continues the new driving without interruption.

Times represents a signal recorded for ease of operations.

Subject image plane trace assumes a moving subject and shows the movement of the corresponding subject image plane. The subject image plane moves independently and without relationship to the camera sequence.

Lens image plane trace represents the movement of the lens focus plane. Following the lowering of the mirror, the range measurement results begin lens driving at time T1. The goal is to match the lens focus plane to the subject position at the time of the next exposure (T4).

Figure 3:
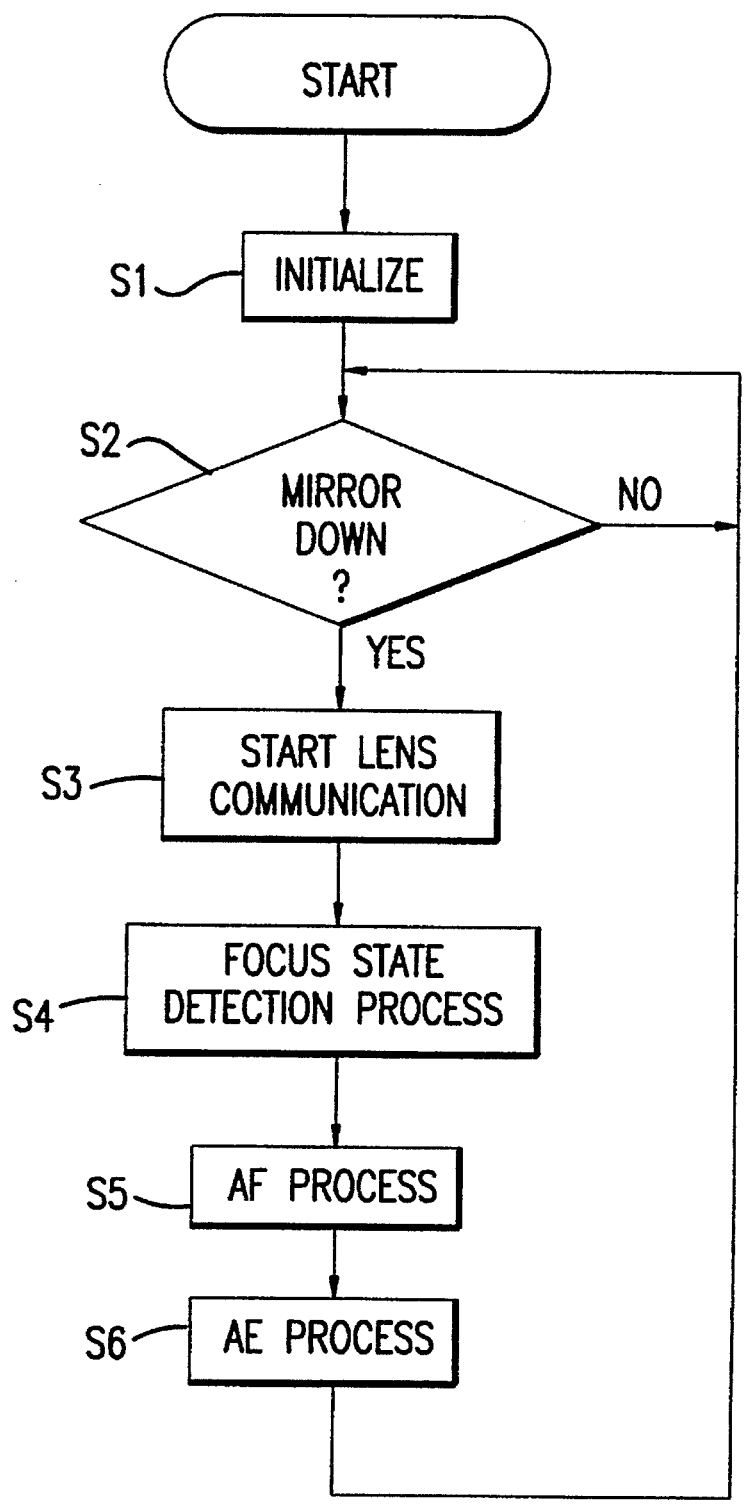
FIG. 3 is a flowchart showing the microcomputer processes in a camera according to an embodiment.

FIG. 3 shows a summary flow of the microcomputer 1 according to the first embodiment. The microcomputer 1 starts the actions in step S0 according to a predetermined program in ROM when the reset of a reset circuit (not shown) linked to microcomputer 1 is released. In step S1, initialization is conducted. Initialization includes clearing and performing initial settings for the RAM, and performing initial settings for serial communication, A/D conversion, the timer, time measuring, event count, external interruption, I/O port and the like.

Step S2 determines whether the mirror has been lowered using the mirror signal. The mirror signal is set and reset as described below and represents the state of the mirror.

The optical path is broken when the mirror is up, therefore, the program waits to perform the photometry and range measurement actions until the mirror is lowered. If the mirror is not down in step S2, while the program waits, processes caused by a release can be started by an interruption and performed in parallel with the mirror wait condition.

When step S2 determines the mirror is down, control passes to step S3. In step S3, lens communication is started to obtain data peculiar to the shooting lens. When shooting lens data are received using the serial communication function and the reception signal interruption function, the data is stored in a predetermined RAM. For example, one byte of data can be successively stored at a time. Preferably, the actual shooting lens data acquisition is conducted in parallel with the A/D conversion process and the CCD accumulation of the focus state detection process performed in step S4.

After the focus state detection process is conducted in step S4, in step S5 the automatic focus (hereinafter AF) process is performed based on the results of the focus state detection process. In step S6, the automatic exposure (hereinafter AE) computation process is conducted. Following the AE process in step S6, control returns to step S2 where the summary flow of the microcomputer 1 is repeated. Therefore, AF and AE computation processes are repeatedly performed.

In this state, when a release is made while repeating steps S2–S6, the program control branches to a release routine as is described below.

Figure 4:
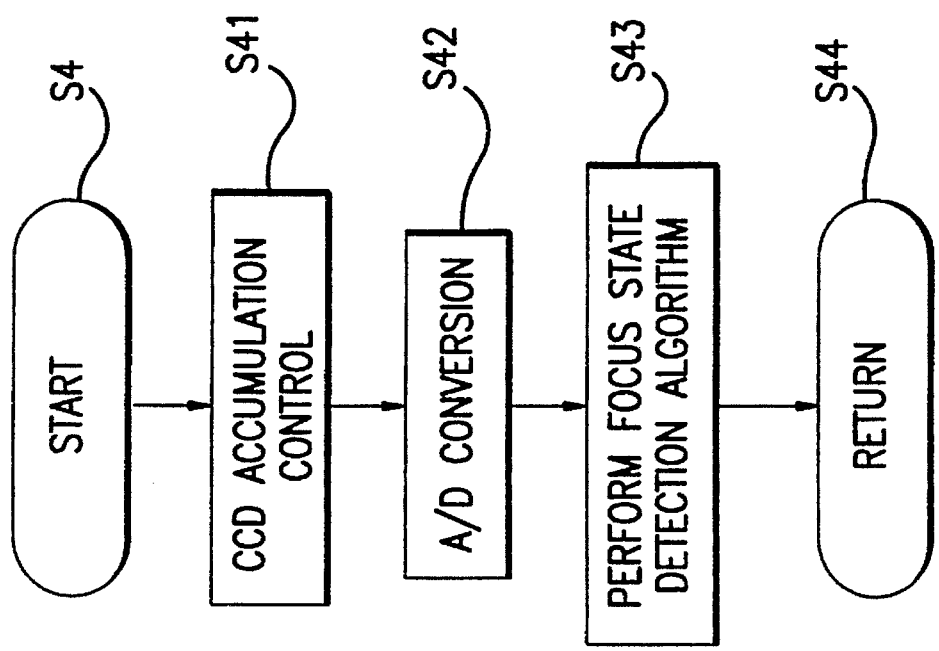
FIG. 4 is a flowchart for focus state detection in a camera according to an embodiment.

FIG. 4 outlines in greater detail one preferred embodiment of performing the focus state detection process of step S4 in FIG. 3.

After starting in step S4, CCD accumulation control is conducted in step S41. When CCD accumulation is completed, in step S42 CCD data dumping is performed simultaneously with A/D conversion, and the subject image data is stored in succession in a predetermined RAM. Because the microcomputer 1 stores the lens position at the time of CCD accumulation in a predetermined RAM at the midpoint of the CCD accumulation time, the pulse number values from the lens rotation detection circuit 8 are each recorded. Then, in step S43, a focus state detection algorithm that is well known in the art is performed. If the subject does not have low contrast in step S43, the defocus amount at the time that the CCD received the subject image is computed. When the subject is low contrast, however, a low contrast determination rather than a defocus amount is obtained as the result of the focus state detection algorithm in step S43. In step S44, the program returns to step S5 in FIG. 3.

Figure 5:
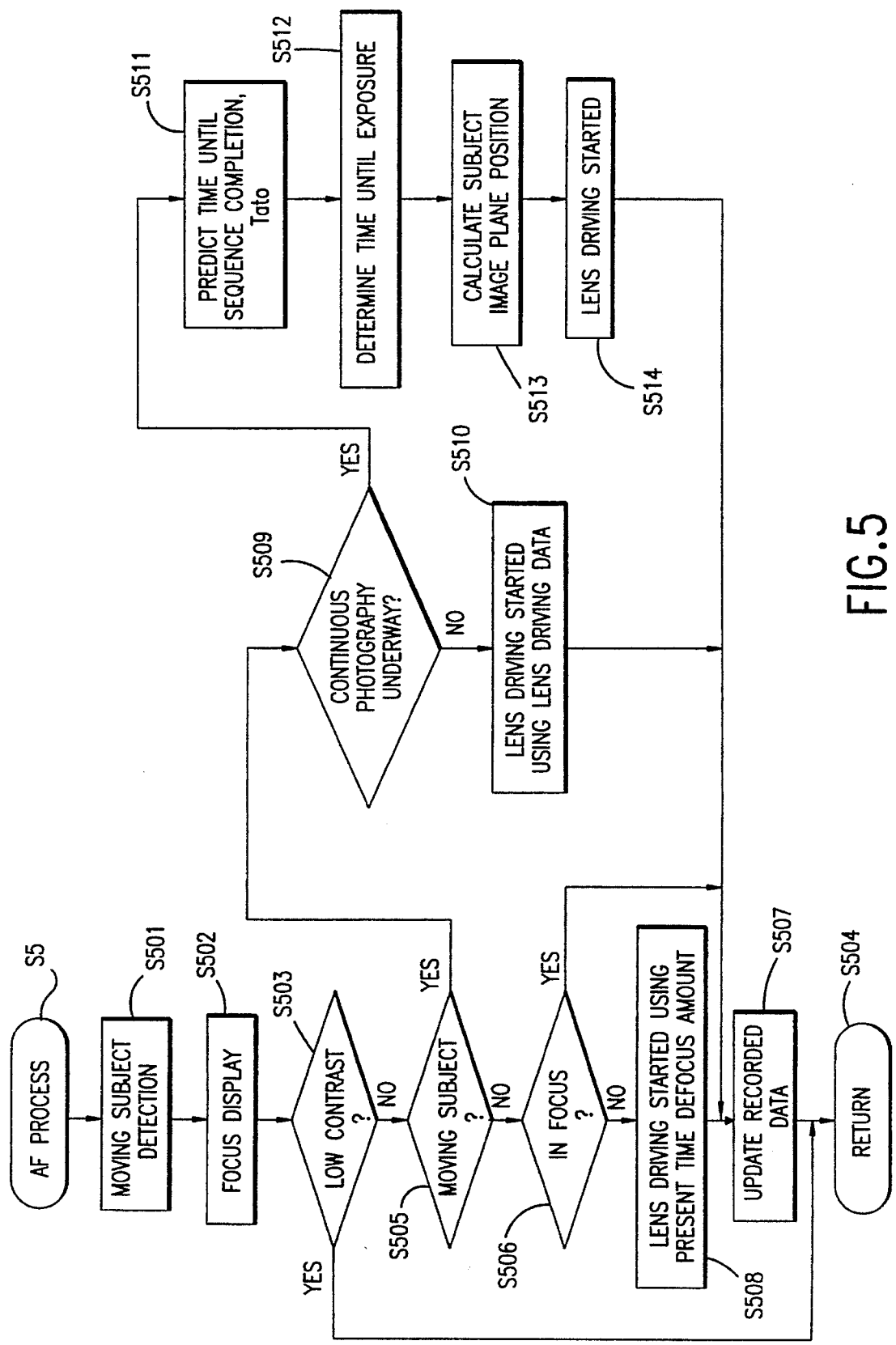
FIG. 5 is a flowchart showing details of focus state detection in a camera according to an embodiment.

FIG. 5 outlines in greater detail one preferred embodiment of performing the specific process contents of the AF process of step S5 of FIG. 3. After starting in step S5, in step S501, the moving subject determination described below determines whether the subject is a moving subject. In step S502, a focus display is conducted by the focus display driving circuit 3 based on the focus state detection results. Step S503 determines whether the results indicated by the focus state detection computation results are low contrast. If the focus state detection results are low contrast in step S503, the program control continues to step S504 where the program returns to step S6 in FIG. 3. When the results in step S503 are not low contrast, program control continues to step S505. Step S505 determines whether the subject is a moving subject. When the subject is not moving, a focus determination is performed in step S506.

When the lens is in-focus in step S506, the program continues to step S507 without starting new lens driving.

In step S507, the three past data items described below, for which the previous ten generations worth of data are stored, are successively rewritten and the oldest generation of data is erased. Then the current three data items are written as the immediately previous data. The current three data items are the current CCD accumulation time that has been recorded, the pulse number value for the lens position at that time, and the defocus value for the focus state detection results. Through this process, the focus state detection database (accumulation time, lens position and defocus) for the ten generations traced back from the current focus state detection database is maintained. In addition, in step S507 the subject image plane velocity is also updated. Then, in step S504 the program returns to step S6 of FIG. 3.

When the lens is not in focus, in step S508 the defocus amount at the present time is calculated and transmitted to the lens through a lens driving command. The defocus amount at the present time will now be described.

If step S505 determines the subject is moving, step S509 determines whether continuous photography is underway based on the H or L level of the release switch input terminal. When continuous photography is not underway, in step S510 the defocus amount at the present time and the subject image plane velocity are transmitted to the lens microcomputer 10 as lens driving data. The lens starts moving based on the lens driving data. Then, the program moves to step S507.

When continuous photography is underway, in step S511 the length of time is predicted till the sequence completion time. For example, the starting point for the time measurement is Ts in FIG. 2. If the present time is called Tnow and is assumed to be the first AF process time after lowering the mirror, time T1 in FIG. 2 becomes Tnow. The time between Tnow and Ts (i.e. Tnow-Ts) is a time interval that has already elapsed in a sequence.

As shown in FIG. 2, TSQ is the length of time needed for a sequence. However, the time needed until the completion of this sequence fluctuates depending on the state of the camera.

For example, the length of time needed for sequence completion is relatively dependent on the battery voltage at that time. Accordingly, there is a method of predicting the completion time with calculations from the battery voltage. Where Vbat is the battery voltage, TSQ can be computed using Equation 1.

$$(220-170) \text{ mS}/(6-4.6) \ V = (TSQ-170) \text{ mS}/(6-Vbat) \ V \tag{1}$$

Further, during continuous photography, the current sequence time interval can be predicted based on the actual length of time needed for the previous sequence.

In the above methods, where Taro is the length of time until the completion of the sequence, Taro can be calculated using Equation 2.

$$Taro = TSQ - (Tnow - Ts) \quad (2)$$

After step S511, the time T until exposure is computed in step S512. The next photographic sequence is entered immediately following a sequence completion. Therefore, where TM is the length of time from the start of raising of the mirror until exposure, T can be computed using Equation 3.

$$T = Tato + TM \quad (3)$$

When the mirror raising action is performed by driving a sequence motor, TM is a relatively constant value or a substantially fixed value. Further, in a camera mechanically executing the sequence from the raising of the mirror until the start of exposure, TM may be a completely fixed value.

Because the time until the next exposure, T, can be predicted prior to the completion of a sequence, in step S513 the subject image plane position at the time of exposure is computed. In step S514, this driving amount is given to the lens and focus adjustment driving is started.

FIG. 7 is a summary drawing showing the relationship between the subject image plane trace and the lens image plane movement trace that is used to compute a lens driving amount.

The present time defocus amount DEFnow computed in step S510, can be determined using Equation 4.

$$DEFnow = DEF0 + V0 * (tnow - t0) - PLSLM \quad (4)$$

In Equation 4, t0 is the recorded current CCD accumulation action time, Tnow is the present time, and V0 is the subject image plane velocity computed in step S501. PLSLM is the difference between the pulse count value at the present time and the pulse count value input through the lens connection group 9. The pulse count value input through the lens connection group 9 corresponds to the lens position at the time of the recorded current CCD accumulation action time. PLSLM converts into a defocus amount by using the lens image plane displacement data per pulse previously received from lens communication. The defocus amount correction corresponds to the lens movement between the accumulation time and the present time.

When the subject is stationary, the present time defocus amount DEFnow computed in step S508 may be computed with V0=0 in Equation 4.

Further, the subject image plane position computed in step S513 becomes the position of T (i.e., TM+Tato from Equation 3) after the present time. Thus, at the time of exposure, the defocus amount DEFdrv (the amount that should be driven) can be determined using Equation 5.

$$DEFdrv = DEF0 + V0*(Tnow - t0) - PLSLM + V0*(TM + Tato) \quad (5)$$

Figure 6:
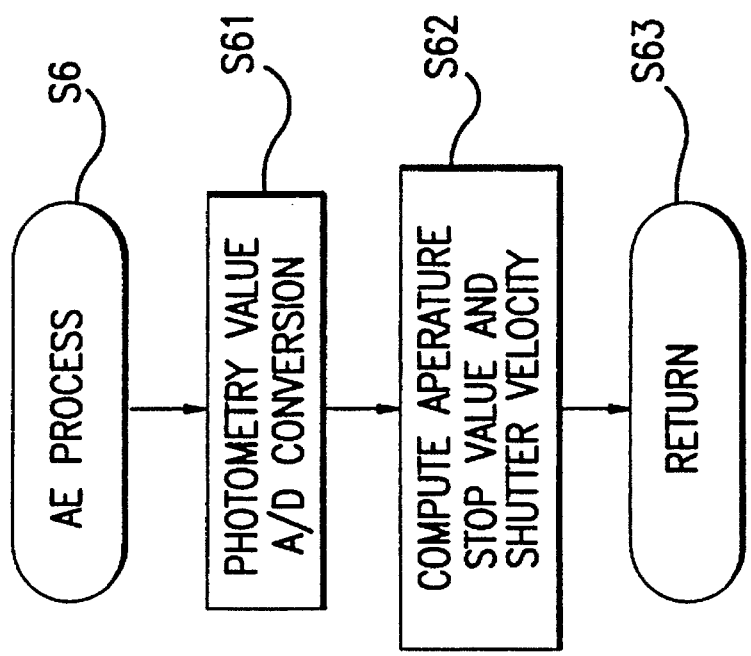
FIG. 6 is an AE process flowchart for a camera according to an embodiment.

FIG. 6 outlines in greater detail one preferred embodiment of performing the AE process of step S6 of FIG. 3. After starting in step S6, the output of an AE photometry circuit (not shown) undergoes A/D conversion to obtain a photometry value in step S61. The stop value and shutter time in seconds are calculated based on the photometry value in step S62. Then, in step S63, the program returns to step S2 in FIG. 3.

Figure 8:
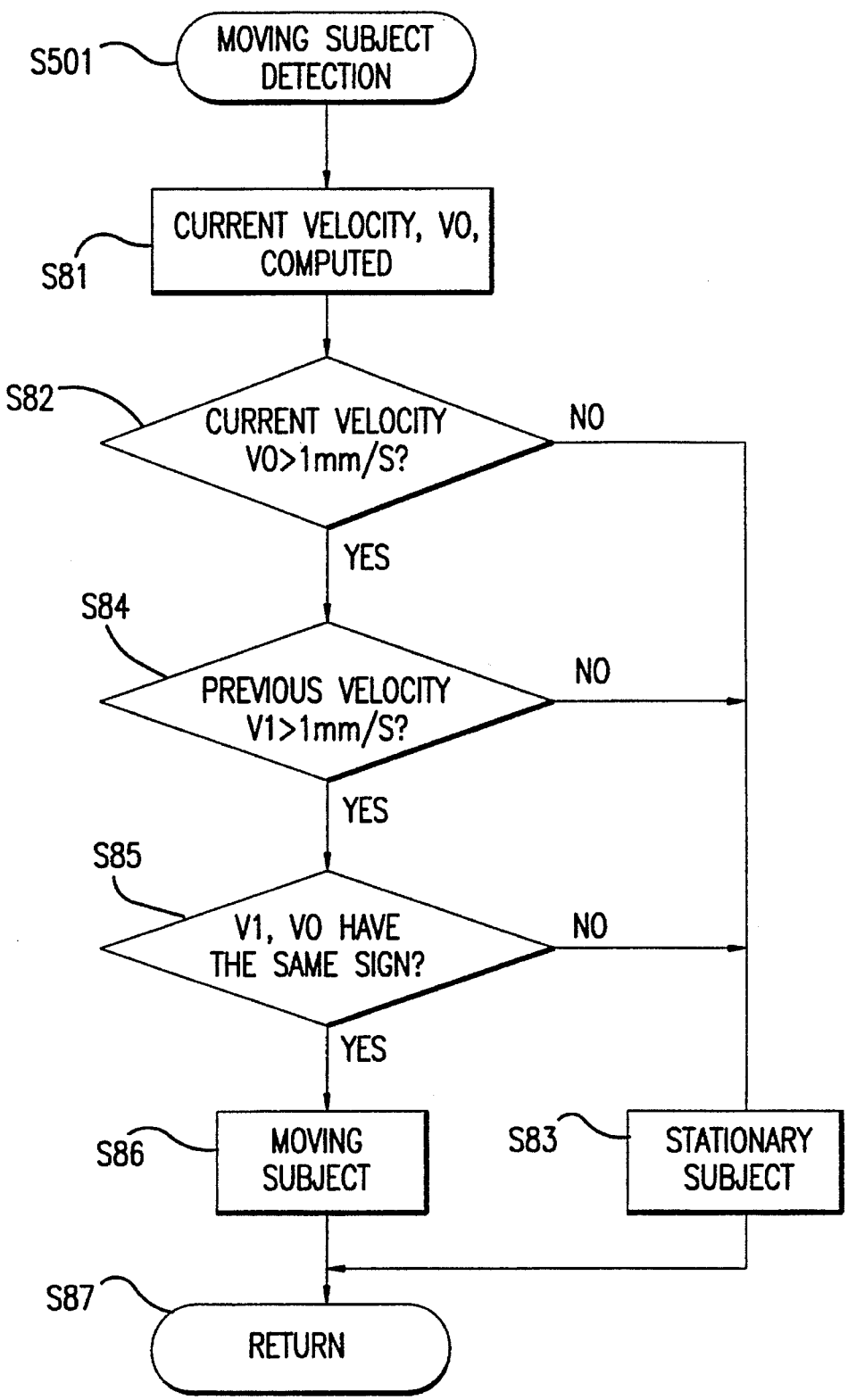
FIG. 8 is a flowchart for detecting moving subjects in a camera according to an embodiment.

FIG. 8 outlines in greater detail one preferred embodiment for performing the moving subject detection of step S501 in FIG. 5. After starting in step S501, the current velocity V0 is computed in step S81. Then, step S82 determines whether the current image plane velocity is greater than a predetermined value. If the image plane velocity is less than or equal to the predetermined value, control continues to step S83. For example, when the image plane velocity is not greater than 1 mm/s, in step S83 the subject is determined to be stationary. From step S83, the program continues to step S87 where program control returns to step S502 in FIG. 5. When the velocity exceeds the predetermined value in step S82, for example, 1 mm/s, the program continues to step S84. A similar determination is conducted in step S84 for the image plane velocity computed previously in step 82. If the current image plane velocity in step S84 is not greater than 1 mm/s, the subject is considered to be stationary, and so the program returns to step S83. When the velocity exceeds 1 mm/s in step S84, the step S85 determines whether the signs of the previous and current subject image plane velocities are the same. In step S85, when the signs are not the same, the subject is stationary; however, when the signs are the same the program continues to step S86. In step S86, the subject is determined to be a moving subject. Then, in step S87, the program control returns to step S502 in FIG. 5.

Figure 10:
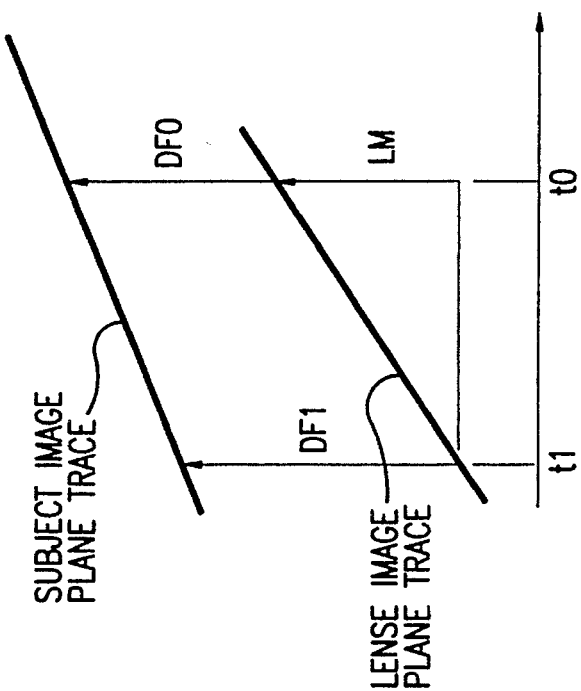
FIG. 10 is a drawing showing the subject image plane movement and lens image plane movement for image plane velocity computations according to an embodiment.
Figure 9:
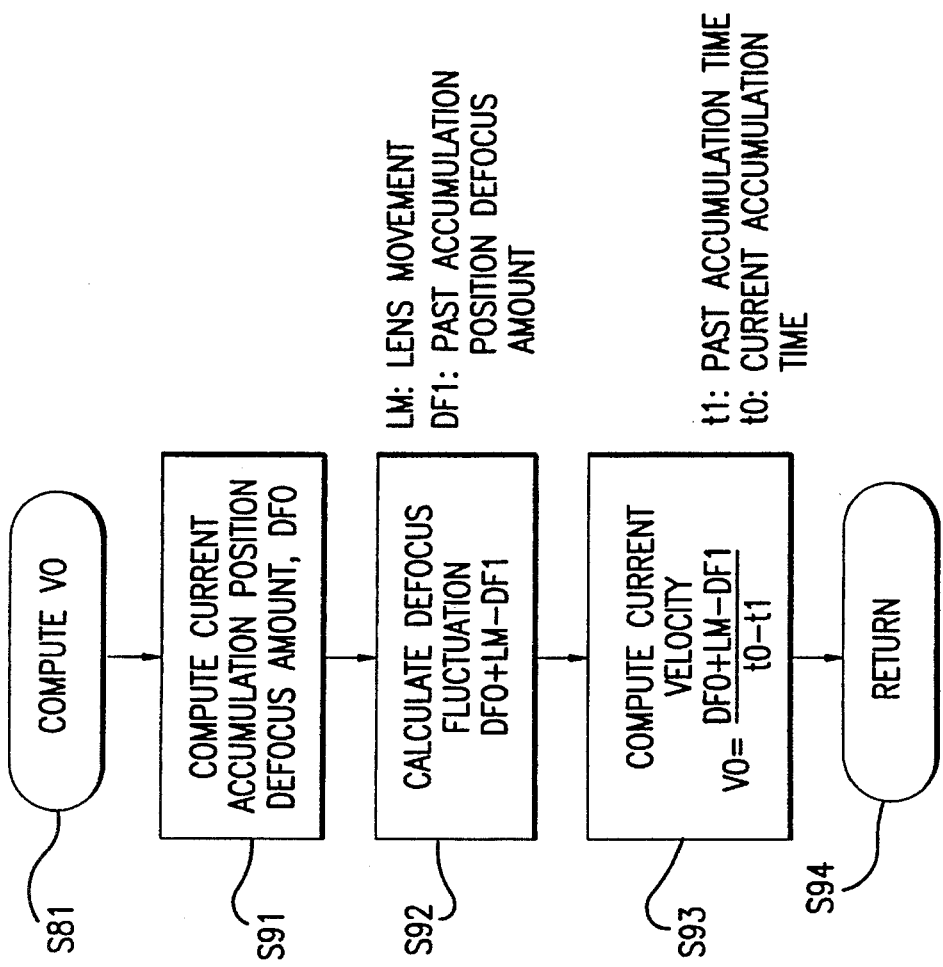
FIG. 9 is a flowchart for finding the movement velocity of a moving subject in a camera according to an embodiment.

FIG. 9 outlines in greater detail one preferred embodiment for performing the current subject image plane velocity determination of step S82 in FIG. 8. In addition, FIG. 10 shows the subject image plane movement and the lens image plane movement used in the image plane velocity computation.

First, in step S91, the immediately previous (current) focus state detection results DF0 are read from the RAM. This DF0 is the defocus amount at time t0 when CCD accumulation was conducted.

In step S92, defocus amount DF1, which is past data of the same focus state detection results stored in the RAM, is read from the RAM, and the defocus fluctuation can be determined using Equation 6.

$$DF0 + LM - DF1 \quad (6)$$

In Equation 6, LM is the subject image plane correction accompanying movement of the lens itself at time t0. LM corresponds to DF0 from CCD accumulation time t1 when the past defocus amount DF1 was obtained. The difference between the event count pulse number at time t1 and the event count pulse number at time t0 is converted to an image plane displacement to determine the correction, LM. The microcomputer 1 uses lens image plane displacement data per pulse, which is lens data received beforehand by the microcomputer 1 through the lens connection group 9. The microcomputer multiplies this by the counted number of pulses to determine LM.

Because the subject image plane fluctuation, which is considered the movement of the subject itself between times t0 and t1, can be obtained from Equation 6 in step S93, the image plane movement velocity V0 can be determined using Equation 7.

$$V0 = (DF0 + LM - DF1)/(t0 - t1) \quad (7)$$

Figure 12:
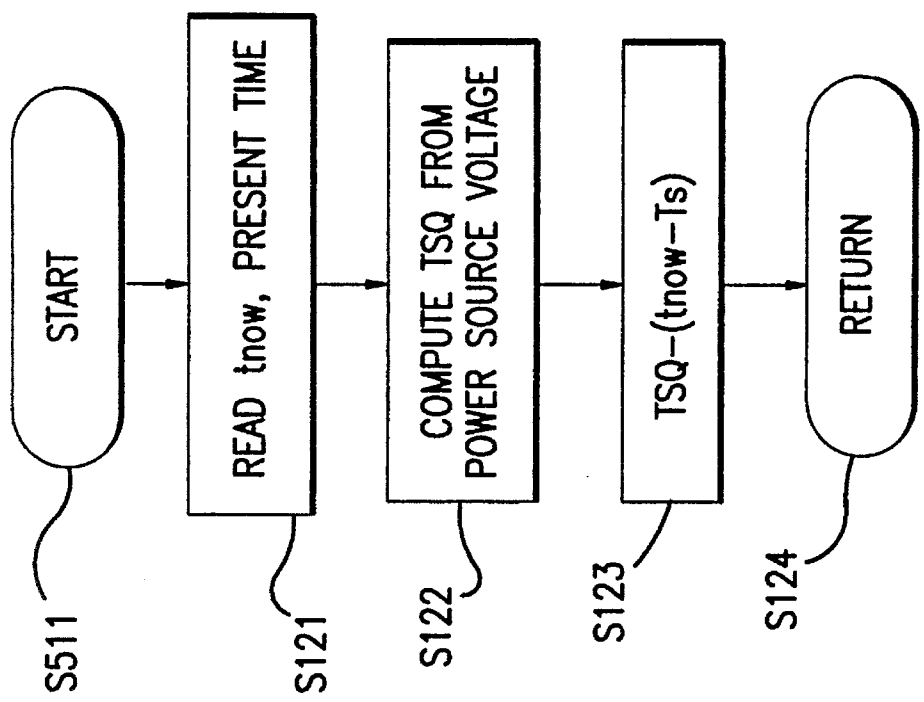
FIG. 12 is a time predicting method up to sequence completion during focus state detection according to an embodiment.
Figure 11:
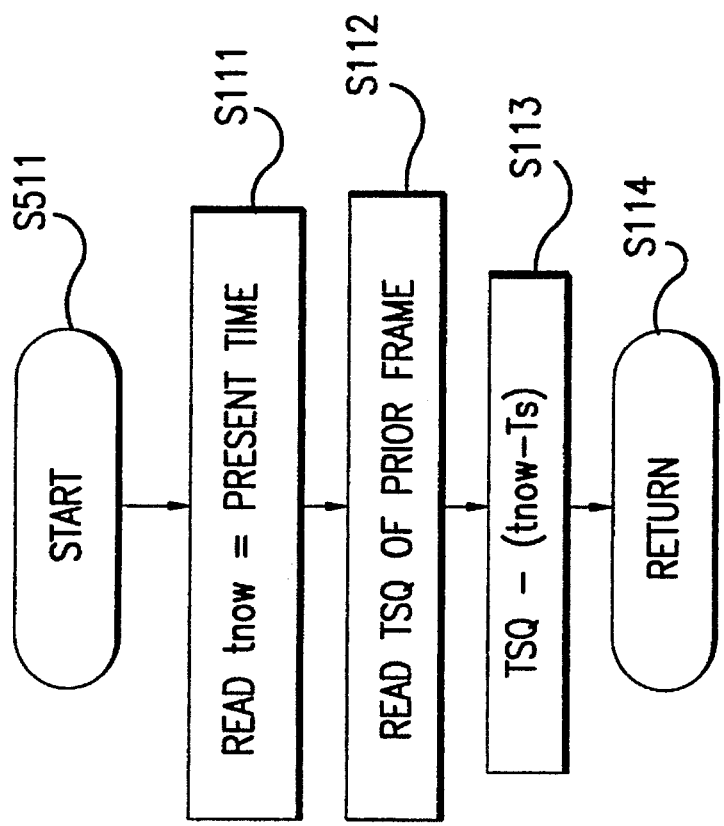
FIG. 11 is a time predicting method up to sequence completion during focus state detection according to an embodiment.

FIGS. 11 and 12 outline in greater detail preferred embodiments of predicting the time until sequence complete of step S511 in FIG. 5. FIG. 11 shows an example where TSQ is determined from the recorded previous sequence performance time. FIG. 12 shows an example where TSQ is determined from the battery voltage.

Figure 13:
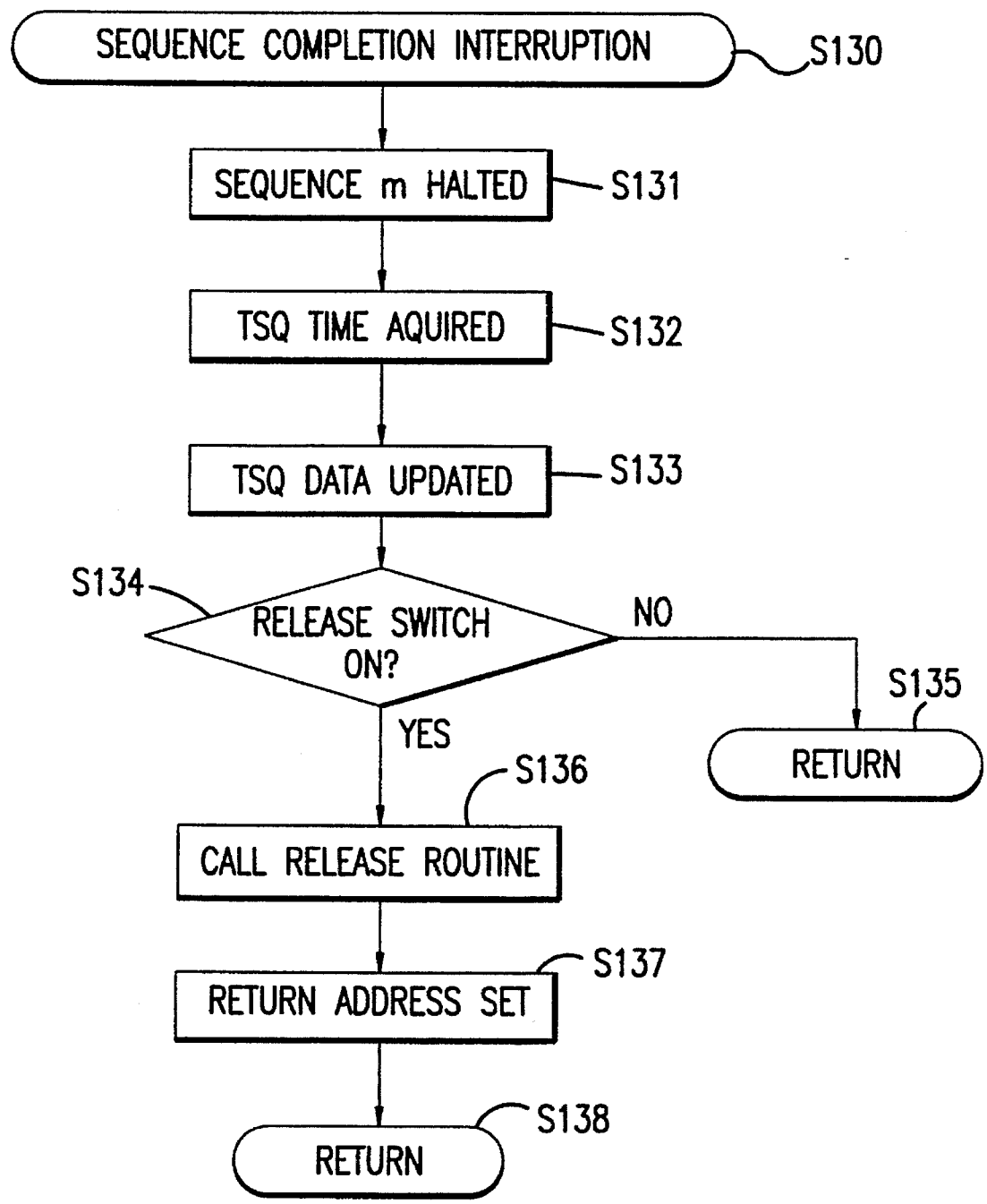
FIG. 13 is a sequence interruption flowchart for the microcomputer in a camera according to an embodiment.

FIG. 13 outlines in greater detail one preferred embodiment of the sequence completion interruption of the microcomputer 1. Sequence completion interruption executes when the shutter charge is completed by driving of the sequence motor after the photographic action. Turning switch 13 on generates a sequence-completion interruption request.

In step S131, the sequence motor is halted. Steps S132 and S133 are processes required by the embodiment of FIG. 11. In step S132 the time TSQ is acquired using the elapsed time from the sequence motor driving start time recorded in step S148 described below. In step S133, the previous TSQ time data already recorded is updated. These steps S132 and S133 are not particularly necessary for the embodiment shown in FIG. 12.

Step S134 determines whether the release switch 12 is on. When the switch is not on, a sequence completion recognition is conducted and control continues to step S135. Program control then returns from step S135 to the step following the step where this interruption was generated.

When the release switch is on, step S136 is called to perform a release routine because the camera is in a continuous photographic state and the next release action is given. When the release routine of step S136 ends, the mirror lowering wait state of step S2, is set as the return address in step S137. The program continues to then step S138 where control jumps back to step S2 of FIG. 3.

Figure 14:
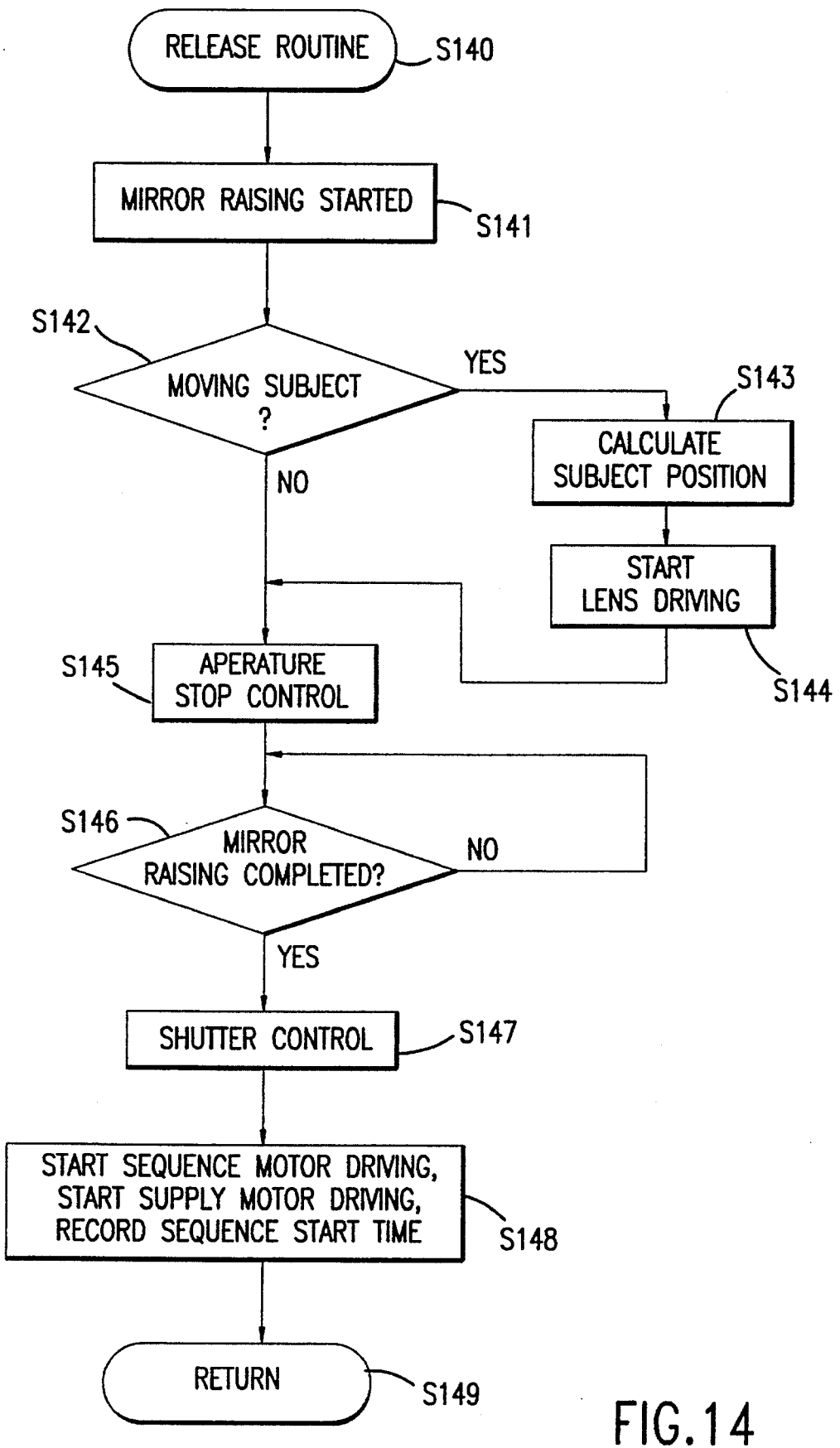
FIG. 14 is a flowchart showing the release routine in a camera according to an embodiment.

FIG. 14 outlines in greater detail one preferred embodiment of performing specific flowchart of the release routine of step S136 in FIG. 13. After starting in step S140, in step S141 the sequence motor is driven and the mirror up action is started by a mechanical mechanism (not shown). Alternatively, the mirror up action can be a mechanical operation using the restoring force of a spring through the release of an engagement stop or the like.

Step S142 determines whether the subject is a moving subject. If the subject is a moving subject in step S142, the subject position is calculated in step S143. The lens driving amount is computed in step S144 and lens driving starts. Then, control of the desired stop value determined in the AE process of step S6 in FIG. 3 is conducted in step S145.

When the subject is not a moving subject in step S142, the program jumps to step S145 to perform aperture stop control without starting new lens driving.

Next, in the step S146, a test is conducted to determine whether raising of the mirror is complete. When the mirror is in a raised state, the program continues to step S147 where an exposure action is executed by separating the shutter front blind (1MG) and the shutter rear blind (2MG) for a predetermined time interval corresponding to the shutter time. When the shutter action is completed, step S148 starts the sequence motor driving to charge the shutter, and the supply motor driving to supply film to prepare for the next exposure action. Simultaneously, the sequence motor electric current start time is recorded. In step S149, the program returns to the step following the one that called this routine.

Figure 15:
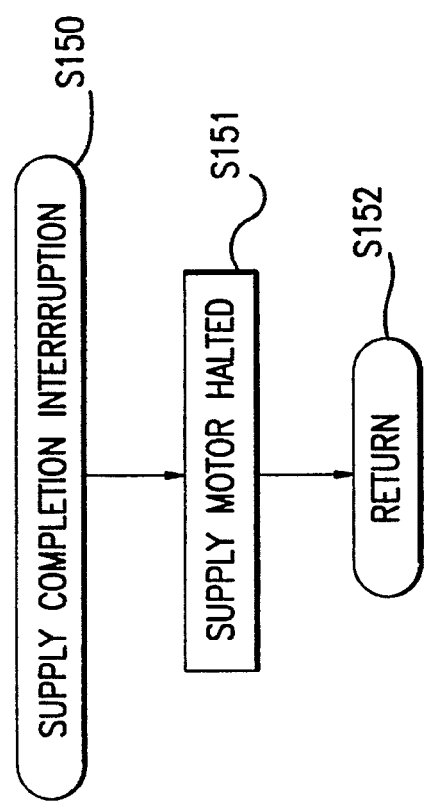
FIG. 15 is an interruption flowchart for indicating film supply completion according to an embodiment.

The supply completion interruption request of FIG. 15 is generated when a predetermined amount of film is supplied.

Using a method similar to that of step S513 of FIG. 5, the subject position calculation driving amount of step S143 can be determined using Equation 8.

$$DEFdrv=DEF0+V0* (Tnow-t0)-PLSLM+V0* TM. \qquad (8)$$

In Equation 8, DEF0 is the most recently obtained focus state detection defocus amount. V0 is the most recently obtained subject image plane velocity. Tnow is the time at which this calculation is executed. t0 is the most recently obtained CCD accumulation action time for focus state detection. PLSLM is the difference between the pulse count value at the present time and the pulse count value input through the lens connection group 9. The pulse count value input through the lens connection group 9 corresponds to the lens position at the time of the last recorded CCD accumulation action time for focus state detection. PLSLM converts into a defocus amount by using the lens image plane displacement data per pulse previously received from lens communications. The defocus amount correction corresponds to the lens movement between the accumulation time and the present time.

V0 * TM is the image plane distance that the subject image plane travels having a velocity of V0 from now until time TM.

A major difference between Equation 8 and Equation 5 is Tato. Tato is not in Equation 8 because the release sequence has already been started.

FIG. 15 outlines in greater detail one preferred embodiment for performing the film supply completion interruption routine. In step S150, the supply completion interruption signal is generated. In step S151, the film supply motor is turned off. The program then returns from step S152 to the next step after the creation of the interruption.

Figure 16:
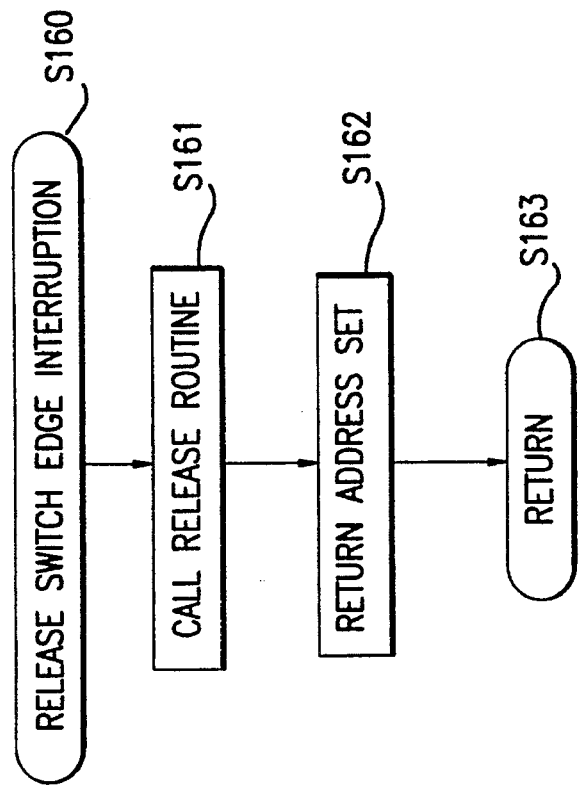
FIG. 16 is a release switch edge interruption flowchart according to an embodiment.

FIG. 16 outlines in greater detail one preferred embodiment for performing release switch edge interruption routine. When the release switch 12 is turned on through operation of an external operation member, an interruption is generated. The interruption jumps program control to step S160 and corresponds to the release time of the first frame of continuous photography. The program continues to steps S161, S162 and S163, which are the same as steps S136, S137 and S138 in FIG. 13, respectively. Thus, details of these steps are omitted here.

During continuous photography, the present invention predictively computes the time of completion of the photographic preparation sequence, which is shutter preparation and film supplying. Then, the subject image plane position at the time of the next exposure is computed from this predictive computation result and the focus state detection results. Finally, the lens is correctly driven based on these computation results. Therefore, a focussed picture results.

For example, there can be fluctuation in the shutter preparation (shutter charge) time or the film supply time because of a drop in the power source voltage in the camera during continuous photography. As a result, the frame interval can change. The present invention correctly handles these situations.

However, in this continuous photography situation, a conventional type of automatic focus camera uses a constant frame interval. The premise that the photographic preparation sequence always will be completed within this predetermined length of time is faulty. The subject image plane position at the time of exposure deviates because the photographic preparation sequence may not completed within a predetermined length of time. As a result, the conventional camera lens focussing the photograph by shifting the subject image plane position is incomplete. Therefore, an out of focus photograph results.

In contrast, the present invention performs correctly during the continuous photography situation as described above. The subject image plane position at the time of the next exposure incorporates the completion time of the photographic preparation sequence in the predictive computations of the present invention. Consequently, even if the frame interval changes for some reason, an accurate focussed photograph is obtained.

As many different embodiments of this invention may be made and used without departing from the spirit and scope, it is understood that the invention is not limited to the specific embodiments.

What is claimed is:

1. An automatic focus camera comprising:
   a photographic optical system that composes an image of a subject;

photographic mode selection means for selecting whether to continuously photograph a subject;

focus state detection means for performing focus state detection of the subject and for determining results of the focus state detection;

calculating means for determining a driving amount for focus adjustment of the photographic optical system;

prediction means for predicting a photographic preparation sequence completion time of a photographic preparation sequence;

position computation means for determining a subject image plane position of a next exposure based on the determined focus state detection results and the predicted photographic preparation sequence completion time when the photographic mode selection means selects continuous photography; and driving means for focussing the photographic optical system based on at least the determined focus state detection results, the driving means further performing focus adjustment of the photographic optical system based on the determined subject image plane position.

2. The automatic focus camera according to claim 1, wherein the position computation means determines the subject image plane position of the next exposure by adding a time interval from the photographic preparation sequence completion time until exposure.

3. The automatic focus camera according to claim 1, wherein the prediction means determines the photographic preparation sequence completion time using a previous sequence time interval.

4. The automatic focus camera according to claim 1, wherein the prediction means determines the photographic preparation sequence completion time based on a power source voltage.

5. The automatic focus camera according to claim 1, wherein the photographic preparation sequence performs at least a shutter action preparation.

6. The automatic focus camera according to claim 1, wherein the photographic preparation sequence performs at least a film supply preparation.

7. An automatic focus camera comprising:

a photographic optical system that composes an image of a subject;

a photographic mode selection device that selects whether to continuously photograph the subject and outputs a signal indicating continuous photography;

a focus state detection device that performs focus state detection of the subject and determines results of the focus state detection;

a calculating device that determines a driving amount for focus adjustment of the photographic optical system based on the focus state detection results;

a prediction device that predicts a photographic preparation sequence completion time of a photographic preparation sequence and outputs a photographic preparation sequence completion time signal;

a position computation device that receives the continuous photography signal and the photographic preparation sequence completion time signal and further determines a subject image plane position of a next exposure when the photographic mode selection device signal indicates continuous photography, the position computation device determining the subject image plane position based on the focus state detection results and the photographic preparation sequence completion time; and a driving device that drives the photographic optical system to perform focus adjustment based on the determined driving amount and the focus state detection results, the driving device performing focus adjustment based on the determined subject image plane position.

8. The automatic focus camera according to claim 7, wherein the position computation device determines the subject image plane position of the next exposure by adding a time interval from the photographic preparation sequence completion time until exposure.

9. The automatic focus camera according to claim 7, wherein the prediction device predicts the photographic preparation sequence completion time based on a previous sequence time interval.

10. The automatic focus camera according to claim 7, wherein the prediction device predicts the photographic preparation sequence completion time based on a power source voltage.

11. The automatic focus camera according to claim 7, wherein the photographic preparation sequence performs at least shutter action preparation.

12. The automatic focus camera according to claim 7, wherein the photographic preparation sequence performs at least film supply preparation.

13. A method of automatically focussing a camera having a photographic optical system, comprising the steps of:

selecting a continuous photographic mode to continuously photograph a subject;

performing focus state detection of the subject;

calculating a driving amount of the photographic optical system for focus adjustment;

predicting a photographic preparation sequence completion time of a photographic preparation sequence;

determining a subject image plane position of a next exposure during continuous photography based on the focus state detection results and the predicted photographic preparation sequence completion time;

driving the photographic optical system to perform focussing based on at least focus state detection results; and driving the photographic optical system to perform focus adjustment based on the determined subject image plane position.

14. The method of claim 13, wherein the step of determining the subject image plane step determines the subject image plane position of the next exposure by adding a time interval from the photographic sequence completion time until exposure.

15. The method of claim 13, wherein the step of predicting the photographic preparation sequence completion time uses a previous sequence time interval.

16. The method of claim 13, wherein the step of predicting the photographic preparation sequence completion time is based on a power source voltage.

17. The method of claim 13, wherein the photographic preparation sequence is at least shutter action preparation.

18. The method of claim 13, wherein the photographic preparation sequence is at least film supply preparation.

* * * * *